UNITED STATES PATENT OFFICE.

ARTHUR GEORGE GREEN, OF STOCKPORT, AND ALEXANDER MEYENBERG, OF MANCHESTER, ENGLAND.

FAST BROWN DYE.

SPECIFICATION forming part of Letters Patent No. 641,954, dated January 23, 1900.

Application filed October 7, 1899. Serial No. 732,877. (Specimens.)

*To all whom it may concern:*

Be it known that we, ARTHUR GEORGE GREEN, F. I. C., F. C. S., a subject of the Queen of Great Britain, and a resident of 13 King's Drive, Heaton Moor, Stockport, and ALEXANDER MEYENBERG, Ph. D., a subject of the Emperor of Germany, and a resident of 13 Nelson street, Ardwick, Manchester, in the county of Lancaster, England, have invented a new Fast Brown Coloring-Matter, (for which patents have been applied for in Great Britain dated March 7, 1899; in France dated May 3, 1899, and in Germany dated May 24, 1899,) of which the following is a specification.

This invention (for which Letters Patent have been applied for in England dated March 7, 1899; in France dated May 3, 1899, and in Germany dated May 24, 1899) relates to the production of a new fast brown coloring-matter containing sulfur and capable of dyeing unmordanted cotton from an alkaline sulfid bath in fast brown shades which withstand the action of acids, alkalies, soap, air, and light to a remarkable degree.

The coloring-matter is produced by the oxidation of paratolylenediamin $C_6H_3(CH_3)(NH_2)_2$ (1:2:5) in the presence of thiosulfuric acid in aqueous solution, under the influence of which thiosulfuric acid sulfur is introduced into the new compound. The quantity of thiosulfuric acid used may be varied within considerable limits, the quantity of oxidizing agent being varied accordingly. In general we use from one-half to one molecular proportion of thiosulfuric acid to each molecular proportion of paratolylenediamin. The product is a brownish-black powder insoluble in water and dilute acids, sparingly soluble in carbonated alkalies, readily soluble in sodium sulfid, forming a brown solution, and soluble in concentrated sulfuric acid, forming a greenish-black solution. By reducing agents, such as zinc-powder and caustic soda, it is converted into a leuco compound, which on exposure to air rapidly reoxidizes. From a bath containing sodium sulfid it dyes cotton a fast brown, the fastness of which is still further increased by subsequent passage through a bath containing a bichromate or a salt of copper.

Example: A solution of thirty-one and three-fourths pounds of the monohydrochlorid of paratolylenediamin in fifty gallons of water is mixed with forty-five pounds of crystallized sodium thiosulfate (hyposulfite of soda) $Na_2S_2O_3+5H_2O$, and when all is dissolved there is run into the solution a solution of thirty-seven and one-half pounds of bichromate of soda and eighteen and one-fourth pounds of concentrated sulfuric acid in eight gallons of water. The mixture being cooled to about from 20° to 25° centigrade, thirty pounds of concentrated sulfuric acid diluted with four gallons of water are then added, and after standing for two or three hours a further thirteen pounds of sodium bichromate are added, followed by the addition of thirty-eight pounds more concentrated sulfuric acid. The mixture is then boiled until the dyestuff completely separates, and the said dyestuff is filtered off, washed with water, and dried.

The process herein described forms the subject of a separate application filed by us October 7, 1899, Serial No. 732,878.

Having now particularly described and ascertained the nature of this invention and in what manner the same is to be performed, we declare that what we claim is—

As a new product and new article of manufacture the hereinbefore-described fast brown coloring-matter derived from paratoluylenediamin and containing sulfur which coloring-matter is a brownish-black powder insoluble in water and dilute acids sparingly soluble in alkaline carbonates readily soluble in sodium sulfid forming a brown solution and soluble in concentrated sulfuric acid forming a greenish-black solution and which is readily reduced by zinc-dust and caustic soda to a leuco compound which rapidly reoxidizes on exposure to air; and which dyes unmordanted cotton from an alkaline sulfid bath deep-brown shades of great fastness, and which can be obtained substantially as hereinbefore described.

In testimony whereof we have signed our names to this specification in the presence of two subscribing witnesses.

ARTHUR GEORGE GREEN.
ALEXANDER MEYENBERG.

Witnesses:
ARTHUR VERNON BATHO,
ERNALD SIMPSON MOSELEY.